March 5, 1957   J. W. ALLEN   2,784,323
OVERVOLTAGE PROTECTIVE DEVICE
Filed Feb. 23, 1950

INVENTOR.
JOSEPH W. ALLEN
BY
-ATTORNEY-

United States Patent Office 2,784,323
Patented Mar. 5, 1957

2,784,323

OVERVOLTAGE PROTECTIVE DEVICE

Joseph W. Allen, Montclair, N. J., assignor to Bendix Aviation Corporation, Teterboro, N. J., a corporation of Delaware Application February 23, 1950, Serial No. 145,863

6 Claims. (Cl. 307—57)

The present invention relates to overvoltage protective relays and more particularly to improvements in an overvoltage protective relay of the type shown in the copending application for U. S. patent Serial No. 779,992, filed October 15, 1947, by Robert Lowell Brown, now U. S. Patent No. 2,560,628, granted July 19, 1951.

It is desirable in the event of an overvoltage on one generator of a parallel arrangement that the protectors of the other generators do not trip due to surges caused by the finite time of operation of the protective relays of the faulted generator. In order to prevent the protective relays of the unfaulted generators from tripping, and to aid the protective relays of the faulted generator in tripping, an object of the present invention is to provide a winding responsive to voltages resulting from line currents under unbalanced load conditions and so connected that upon an unbalance in load, there will be established a current in the load sensing winding for the protective relay of the high generator which will be in a direction to accelerate or lower the tripping value of the protective relay switch, while the current through the load sensing coils of the other relays will be in a direction to retard or increase the tripping value of the protective system for parallel connected generators.

Another object of the invention is to provide means in an overvoltage protective device to vary the tripping point thereof.

The above and other objects and features of the invention will appear more fully hereinafter from a consideration of the following description taken in connection with the accompanying drawings wherein two embodiments of the invention are illustrated by way of example.

Figure 1:
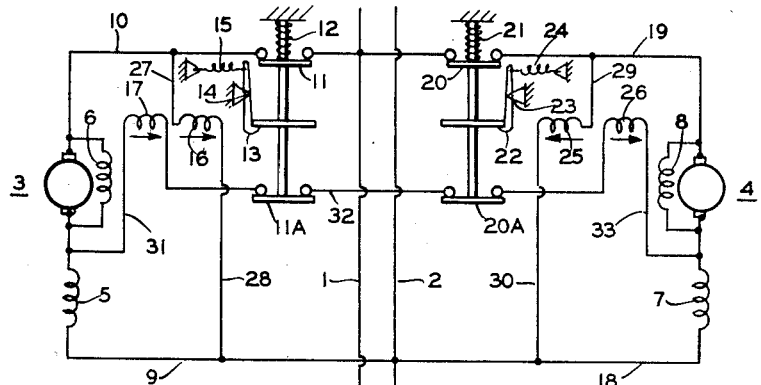
Figure 1 is a simplified schematic diagram illustrating one embodiment of the invention.

Referring to Figure 1 of the drawing, there are shown load lines 1 and 2 adapted to be supplied by a plurality of generators which may be of any suitable type. By way of example, two generators 3 and 4 are shown which may be driven by any suitable means, such as by motors (not shown). The generators 3 and 4 may be provided with suitable regulating means and various other control devices and auxiliaries, all of which are well known in the art but have been omitted from the drawing for simplicity.

The generator 3 has a series field winding 5 and a shunt field winding 6. Likewise, the generator 4 has a series field winding 7 and a shunt field winding 8. Output line 9 of generator 3 is connected to the load line 2, while output line 10 may be connected to the load line 1 through a switch member 11. The switch member 11 is biased under tension of a spring 12 in a direction for opening the circuit of line 10, but is held from opening by a latch member 13 pivoted at 14 under tension of a spring 15 so as to lock the switch member 11 in a circuit closing position. The latch member 13 is controlled by a main electromagnetic winding 16 and an auxiliary winding 17. Likewise, output line 18 of the generator 4 is connected to the load line 2, while output line 19 is connected to the load line 1 through a switch member 20. The switch member 20 is biased under tension of a spring 21 in a direction for opening the circuit of line 19, but is held from opening by a latch member 22 pivoted at 23 under tension of a spring 24 so as to lock the switch member 20 in a closed circuit position. The latch member 22 is controlled by a main electromagnetic winding 25 and an auxiliary winding 26.

The electromagnetic winding 16 is connected by conductors 27 and 28 across output lines 9 and 10 of the generator 3. In like manner, the winding 26 is connected by conductors 29 and 30 across output lines 18 and 19 of generator 4.

One end of the auxiliary winding 17 is connected by a conductor 31 to the negative output of generator 3. The opposite end of winding 17 is connected by a conductor 32 through switch members 11A and 20A to one end of the auxiliary winding 26. The opposite end of winding 26 is connected by a conductor 33 to the negative output of generator 4.

In operation in order to get actual overvoltage protection, it is necessary to have the overload protective device set to trip at a voltage that is close to the normal generator or line voltage and some additional means that will be present only when the generator voltage begins to rise and become excessive to lower the tripping value of the protective device. With such a combination, it is then possible to determine and isolate the particular generator whose voltage tends to rise above the predetermined value.

The windings 16 and 25 are proportioned so as to have sufficient force on the latch members 13 and 22 to overcome the bias of the respective springs 15 and 24 when the voltage of the respective generators exceed a predetermined value. When the voltages of the respective generators are equal, the load division should be equal and no current flows in the auxiliary windings 17 and 26. However, should the voltage of one generator rise, it will take more than its share of load. This unbalance of load will cause current to flow in the auxiliary windings 17 and 26. The flux produced by the current flow in the windings 17 and 26 will affect the corresponding windings 16 and 25 in a manner depending upon the direction of current flow. For example, assume that generator 3 has the "high voltage" and generator 4 is normal. The current flowing in the winding 17 would be in a direction to aid the winding 16 while the current in the winding 26 would be in a direction to oppose the winding 25. Thus the tripping value of the latch member 13 would be lowered and that of the latch member 22 raised.

Figure 2:
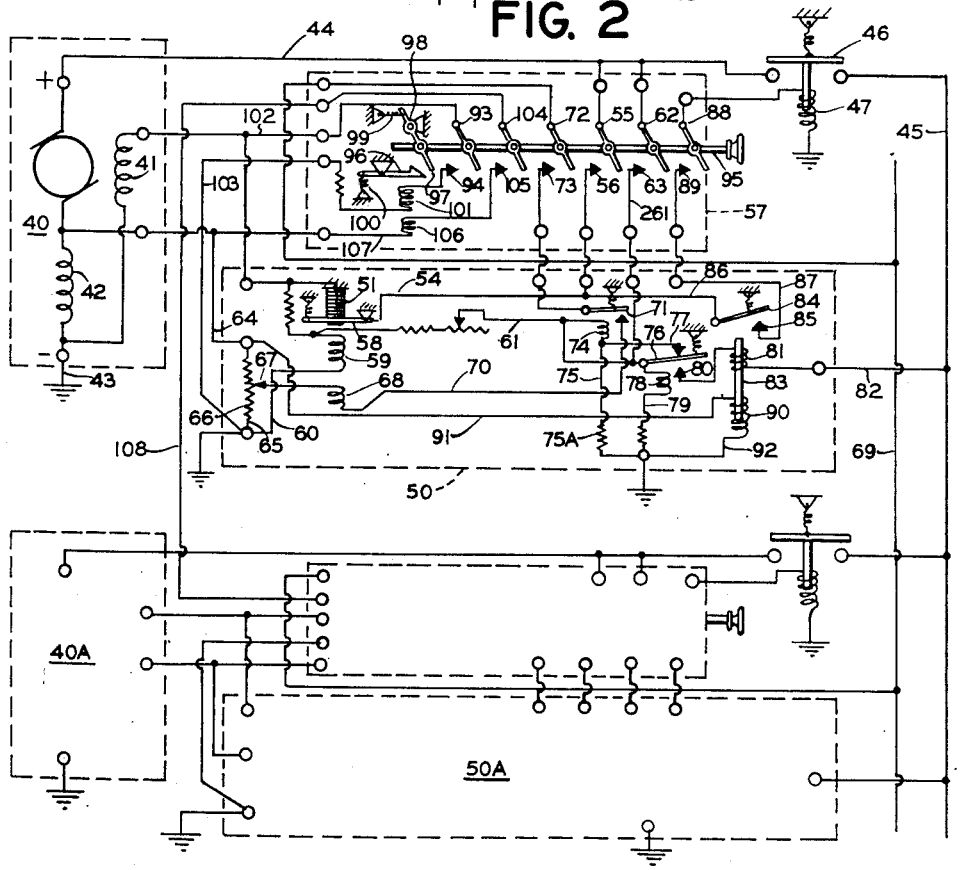
Figure 2 is a diagrammatic view showing the overvoltage protector connected into a generator system.

A typical system embodying the invention is illustrated in Figure 2 and may include a generator 40 having a field winding 41 and an interpole compensating winding 42. Output line 43 of the generator 40 is grounded, while output line 44 may be connected to a main bus line 45 through a line switch 46 operated by a solenoid 47.

The control equipment for the generator is indicated generally by the numeral 50 and may be of a type described and claimed in the copending application Serial No. 621,515, filed October 10, 1945, by William R. Holmes, now U. S. Patent No. 2,576,117, granted November 27, 1951.

The control equipment 50 includes a variable resistance carbon pile 51 connected in series with the generator field 41 through conductor 54 and the main switch contacts 55 and 56 of a protector device 57.

The protector device 57 may be of a type described and claimed in the copending application Serial No. 779,992, filed October 15, 1947, by Robert Lowell Brown, now U. S. Patent No. 2,560,628.

The variable resistance carbon pile 51 may be controlled by an adjustable armature 58 and which may be of a type described and claimed in U. S. Patent No. 2,427,805, granted September 23, 1947, in the name of William G. Neild and assigned to Bendix Aviation Corporation.

The armature 58 may be controlled by an electromagnetic winding 59 which may be connected across the generator output lines 43 and 44 by grounded conductor 60 and conductor 61. The conductor 61 may be connected to line 44 through switch members 62—63 of the protector device 57.

Connected across the interpole compensating winding 42 by a conductor 64 and grounded conductor 65 is a potentiometer 66 having a tap 67 connected to a compensating winding 68 for affecting the carbon pile 51 so as to maintain a predetermined division of load between the several parallel connected generators as is explained in the aforenoted copending application Serial No. 621,515.

The opposite end of the compensating winding 68 may be connected to an equalizer line 69 through a conductor 70, relay switch 71, and switch members 72 and 73 of the protector device 57. The relay switch 71 is controlled by an electromagnetic winding 74 connected across the output lines 43—44 by grounded conductor 75 including resistance 75A, conductor 61 and switch contacts 62 and 63 of protector 57.

The relay winding 74 is controlled by a pilot switch 76 biased by spring tension to the position shown so as to close switch contact 77. Switch 76 is connected to conductor 75 while contact 77 is connected to conductor 61 so that upon switch 76 closing contact 77, relay winding 74 is shunted out of operation.

The pilot switch 76 is controlled by an electromagnetic winding 78 connected through conductor 61 and switch contacts 62—63 of the protector device 57 to output line 44 and through grounded conductor 79 to output line 43.

Upon the output generator voltage rising above a predetermined value the relay switch arm 76 is biased by the relay 78 so as to open contact 77 and close a contact 80. The latter action opens the shunt circuit of relay winding 74 causing the winding 74 to close switch 71 whereupon the compensating winding 68 is connected into operation and to the equalizer line 69.

Moreover upon relay switch 76 closing contact 80 a current winding 81 is connected across the open line switch 46 by a conductive passage leading from line 44 through switch contacts 62—63 of the protective device 57, conductor 61, switch 76, contact 80, current winding 81, and a conductor 82 to the main bus line 45. The winding 81 is wound about a permanent magnet 83 and is arranged to cooperate therewith so that upon a current flow from the generator 40 to the main bus line 45 the magnetic effect of coil 81 and permanent magnet 83 will exert an additive effect biasing a relay switch 84 to close contact 85.

The relay switch 84 is connected by a conductor 86 to conductor 54 and through switch contacts 55 and 56 to the output line 44. The contact 85 is connected by conductor 87 through switch contacts 88—89 of the protector device 57 to the line relay 47. The closing of switch 84 will then cause energization of the line relay 47 and the closing of the line switch 46 which will shunt differential current winding 81 out of operation.

Cooperating with the winding 81 is a second current winding 90 connected across the interpole compensating winding 42 through conductor 91 and grounded conductor 92. So long as the current flow is from the generator 40 to the main line 45 the winding 90 will exert an additive effect with the permanent magnet 83 tending to hold the control switch 84 closed. However in the event the output of the generator 40 decreases to such a point that the current output of the generator is below that of the main bus line 45, then the winding 90 will exert a differential effect with the permanent magnet 83 tending to decrease the magnetic effect acting on the relay switch 84 so that the switch 84 under spring force is biased to a position opening contact 85. The latter action deenergizes the winding 47 causing line switch 46 to open.

Switch contacts 88—89, 62—63, 55—56, 71—72, 93—94 and 104—105 may be closed by manually actuating a push rod 95. The same may be latched in the latter position through action of a latch member 96 engaging a holding member 97 of the push rod 95.

The holding member 97 is pivoted at 98 and is biased towards an open circuit position by a spring 99. The latch member 96 is biased toward an engaging position by a spring 100.

The closing of the switch contacts 93—94 connects a sensing coil, an electromagnetic winding 101 across the field 41 of the generator 40 through conductors 102 and 103. One side of an auxiliary winding 106 is connected by conductor 107 to the negative output side of the generator 40. Closing of the switch contacts 104—105 connects the other side of the winding 106 to a conductor 108.

As shown diagrammatically in Figure 2, a plurality of generators may be parallel connected to the main bus line 45, the generators 40 and 40A being shown by way of illustration. The generator 40A has similar control equipment to that indicated generally by numeral 50 and indicated herein as 50A. Likewise, the generator 40A has a protective device similar to the protective device 57 and indicated herein as 57A and includes an auxiliary winding 106A connected to the conductor 108.

In operation upon the voltages of the generators being equal, the load will be shared evenly and no current will flow in the auxiliary windings 106 and 106A. Upon a rise in voltage of one of the generators, for example, in generator 40, it will take more than its share of the load. This unbalance of load will cause current to flow in the auxiliary windings 106 and 106A. The current flow in the winding 106 will be in a direction to set up a flux in aiding relationship to the main winding 101, while the current flow in the winding 106A will be in a direction to set up a flux in opposition to the main winding 101A. The windings 101 and 106 coact to overcome the bias of the spring 100 and actuate the latch member 96, thus releasing the reset rod 95 thereby opening the main contacts 55—56, and the five pairs of auxiliary contacts 62—63, 71—72, 88—89, 93—94 and 104—105.

In the latter event the following action takes effect. The contacts 88—89 open the potential circuit for the line relay 47 and thereby cause line switch 46 to open and effect deenergization of current winding 90. The contacts 62—63 open the potential circuits for the carbon pile voltage coil 59, relay voltage coil 74, and relay voltage coil 78. Deenergization of coil 78 causes in turn relay switch 76 to open contact 80 and thereby the circuit to differential current coil 81. The main contacts 55—56 open the generator field circuit. The auxiliary contacts 71 and 72 open the circuit of the compensating winding 68. The auxiliary contacts 93 and 94 open the circuit of the sensing coil 101 and the contacts 104—105 open the circuit of the auxiliary coil 106.

Thus overvoltages, due for example to a faulted generator, are sensed before the voltage reaches a predetermined maximum safe value and is removed from the line by the auxiliary winding 106 coacting with the winding 101. The aiding flux provided by the winding 106 tends to lower the tripping point of the protector 57 in order to remove the faulted generator from the line before the voltage rises to the predetermined maximum. In the non-faulted generators the opposing flux in the auxiliary winding tends to raise the tripping point of the protector 57A in order that it will not be actuated by the fault on the other generator.

What is claimed is:

1. In combination, an output line, a pair of generators connected to said output line, each of said generators having a field circuit and overvoltage protector means, said overvoltage protector means including a main electromagnetic control winding adapted to actuate said protector means upon the current flow across the field circuit exceeding a predetermined value and an auxiliary winding responsive to the difference in field current of said generators to effect said main winding to vary said predetermined value in a sense depending upon the direction of unbalance.

2. In combination, an output line, a pair of generators connected to said output line, each of said generators having a field circuit, and overvoltage protector means for disconnecting the associated generator from the output line upon a rise in output voltage above a predetermined value, said overvoltage protector means including a first electromagnetic winding responsive to current flow across the field circuit of the associated generator and a second electromagnetic winding responsive to the difference in field current between said generators to affect said first winding in accordance with the difference in field current between said generators.

3. In combination, an output line, a plurality of generators connected to said output line, each of said generators having a field circuit, control means responsive to the current flow across the field of each generator for disconnecting the associated generator from the output line upon a rise in field current above a predetermined value, and auxiliary means responsive to the difference in field current between the respective generators to affect said control means in a direction depending upon the direction of unbalance.

4. In combination, an output line, a plurality of generators connected to said output line, each of said generators having a field circuit, control means for each generator for disconnecting the associated generator from the output line upon a rise in field current above a predetermined value, said control means including a first electromagnetic winding responsive to the current flow across the field of the associated generator and a second electromagnetic winding responsive to unbalanced current flow between said generators, said windings coacting to effect said control means.

5. In combination, a main output line, a generator, a field circuit for controlling the output of said generator, a main control switch for connecting said generator to said main output line, a main electromagnetic winding circuit for controlling said main switch, a regulator connected in said field circuit, a control winding for said regulator and connected across the output of the generator, an overvoltage protective means, said overvoltage protective means including a main operating winding connected across said field circuit and an auxiliary winding responsive to an unbalance of current flow in said output, said last two windings coacting to effect said overvoltage protector means to deenergize said main electromagnetic winding circuit to actuate said main control switch upon the voltage across said main operating winding exceeding the voltage of said main output line by a predetermined amount.

6. In combination, an output line, a pair of generators connected to said output line, each of said generators having a field circuit and overvoltage relay means, each of said relay means including a switch member, a main electromagnetic winding connected across said field circuit, an auxiliary electromagnetic winding, said auxiliary winding being connected in series with the auxiliary winding of the other of said generators, said auxiliary windings being responsive to the current flow between said field circuits to affect said main windings in a sense depending upon the direction of current flow.

References Cited in the file of this patent

UNITED STATES PATENTS 2,483,117    Almassy _____ Sept. 27, 1949